United States Patent [19]
Krumholz

[11] Patent Number: 4,538,993
[45] Date of Patent: Sep. 3, 1985

[54] COMPUTER TEACHING SYSTEM

[76] Inventor: Freda Krumholz, 4093 Legion Ct., Lafayette, Calif. 94549

[21] Appl. No.: 584,043

[22] Filed: Feb. 27, 1984

[51] Int. Cl.³ ............................................. G09B 19/00
[52] U.S. Cl. ................................................... 434/118
[58] Field of Search ............... 434/307, 323, 336, 350, 434/118, 157, 320

[56] References Cited

U.S. PATENT DOCUMENTS

| | | | |
|---|---|---|---|
| 3,147,555 | 9/1964 | Dufendach et al. | 434/320 |
| 3,200,516 | 8/1965 | Parker | 434/320 |
| 3,975,835 | 8/1976 | Reichman | 434/118 |
| 4,052,798 | 10/1977 | Tomita et al. | 434/307 |
| 4,310,317 | 1/1982 | Nomura et al. | 434/350 X |

Primary Examiner—William H. Grieb
Attorney, Agent, or Firm—Townsend and Townsend

[57] ABSTRACT

A classroom computer network requiring no direct visual contact between teacher and student, comprising student stations with microcomputers, display screens, and controls for transmitting to a teacher screen, and a teacher station with a switching console for selectively connecting student and teacher screens for display on any screen.

11 Claims, 7 Drawing Figures

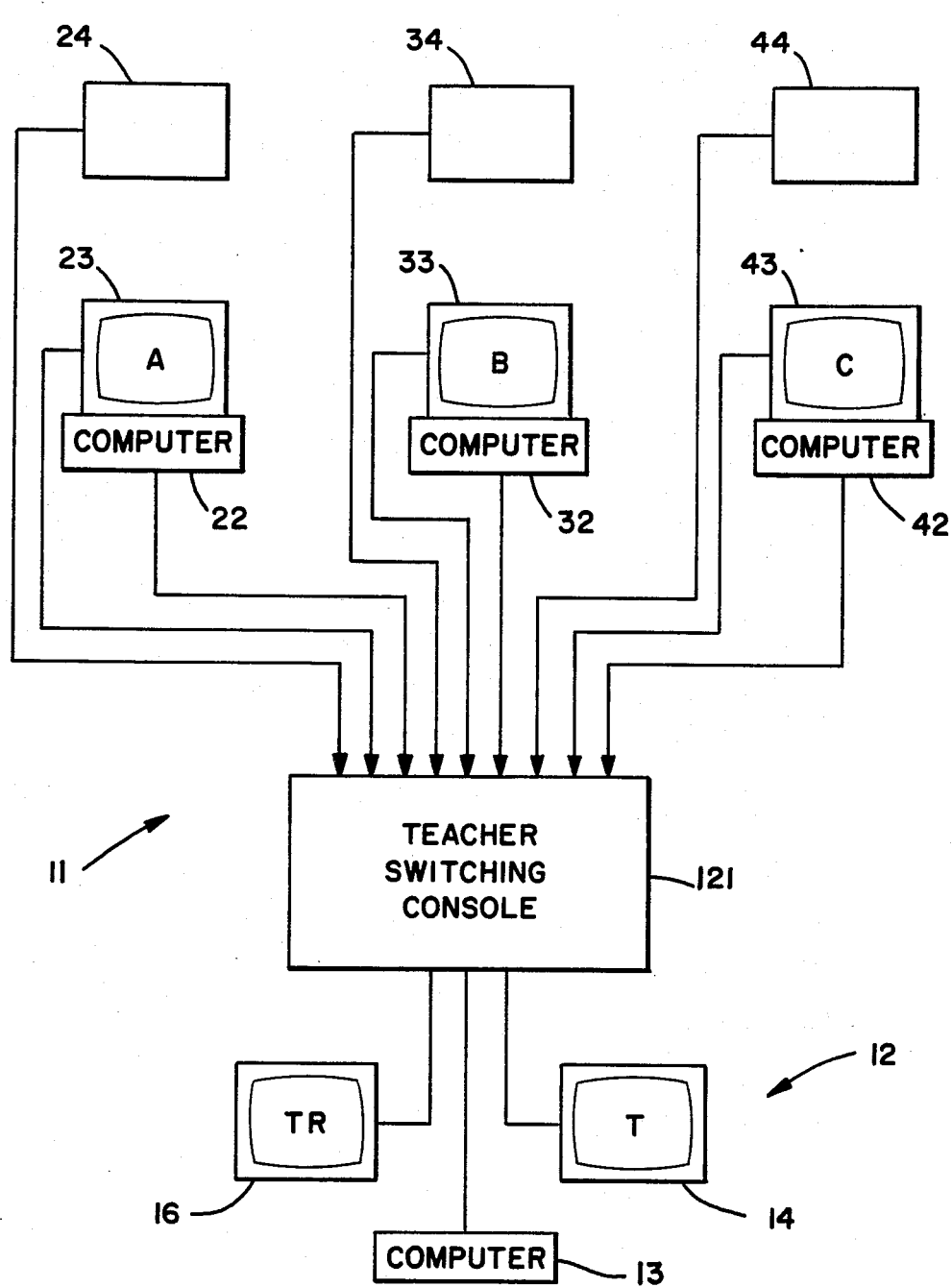
FIG _ 1

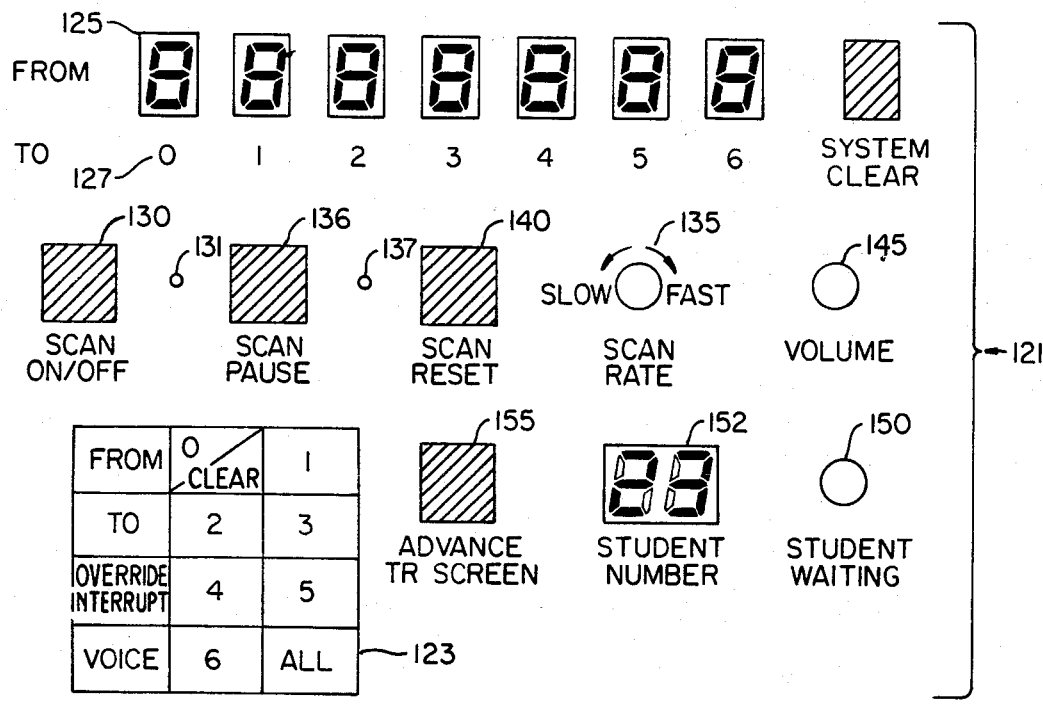
FIG._2.
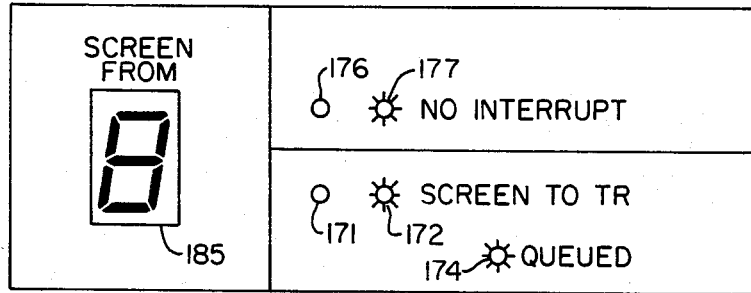
FIG._3.

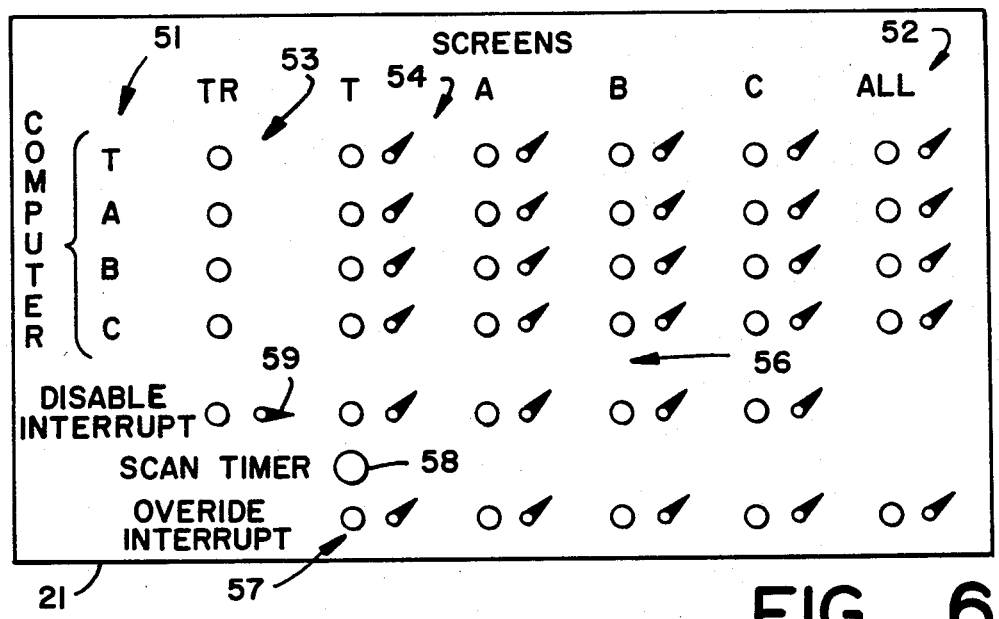
FIG _ 6
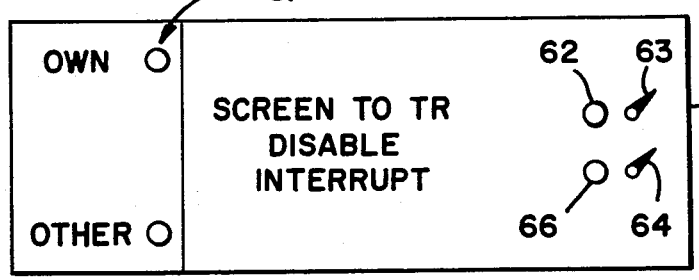
FIG _ 7
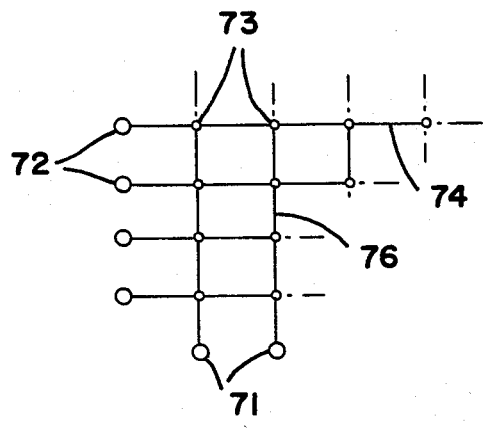
FIG _ 4
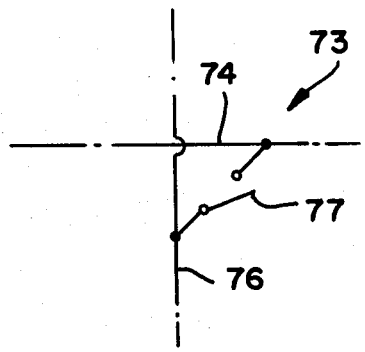
FIG _ 5

COMPUTER TEACHING SYSTEM

BACKGROUND OF THE INVENTION

The present invention relates to networks for displaying computer output upon screens at separate locations. Such networks typically require compatible computers or complicated translating equipment, and do not normally allow viewer feedback.

SUMMARY OF THE INVENTION

The present invention provides a computer output communications system which does not require compatible computers or translators. It is useful for teaching, demonstrations, sales presentations, simulations of problems and situations, cooperative design efforts, and monitoring the activity of multiple computers.

The primary station includes a console, a computer and one or more display screens. The console contains switches for switching computer video and audio output signals between primary and secondary station display screens, associated indicating lamps or devices, and transmit interrupt controls. Secondary stations each include a computer, a display screen, a switch for sending a request to the primary station to have the secondary display connected to a primary station screen, and a light indicating whether the screen at the secondary station is displaying its own or another computer's output.

The primary station console may be implemented either to switch analog or digitized video signals, and may interconnect dissimilar computers. Only display screen signals are transferred and thus the individual computers may have different programs.

The invention allows a teacher to oversee or correct student activities using a computer without physically moving between stations, which may be in different rooms. The computer and the display screen at each station may be separate devices. While the invention is particularly adapted to microcomputers, it could alternately employ a single computer with operating terminals at the various stations.

BRIEF DESCRIPTION OF THE DRAWINGS

FIG. 1 is a block diagram of an instruction system using multiple stations in accordance with the present invention;

FIG. 2 is a primary station switching console;

FIG. 3 is a secondary station controller;

FIG. 4 is a partial illustration of a switching matrix;

FIG. 5 is a matrix switch;

FIG. 6 is an alternate embodiment of the primary station switching console; and

FIG. 7 is an alternate embodiment of the secondary station switching controller.

DETAILED DESCRIPTION OF THE PREFERRED EMBODIMENT

The present invention is illustrated in a preferred embodiment as a classroom instruction system including a primary or teacher station 12 and secondary or student stations A, B, and C.

Referring to FIG. 1, system 11 includes a teacher station 12 having a computer 13, a teacher's display screen 14, marked T, for displaying the output of computer 13 and other information, and a teacher receiving screen 16, marked TR. Teacher screens 14 and 16 and others may be conventional cathode ray tubes. Other sources of video signals (not shown) may also be transmitted as desired by the teacher station.

Teacher station 12 includes a switching console 121, shown in FIG. 2, enabling the teacher to display the output of any of the computers upon any of the screens in system 11. Console 121 is connected to the output of teacher computer 13, the inputs to the teacher display screen 14 and teacher receiving screen 16, and to student stations A, B and C.

Console 121 is also connected to the student station A computer 22 output, display screen 23 input, and controller 24. Further student stations B, C, and so forth, include computers 32 and 42, display screens 33 and 43 and controllers 34 and 44, all connected respectively to console 121 in the same manner as like elements of station A.

FIG. 2 illustrates a preferred embodiment of the teacher switching console 121. It has a keypad 123 for setting up the network. The teacher presses the button marked "From", then the number of the desired transmitter station. Subsequently pressing the keypad "To" button, the desired "from" station number lights up a light in row 125 above the appropriate number. Several receiving stations may be connected in this manner, each to a different transmitting station indicated above it, or the "ALL" button may be used to connect all receiving stations to a single transmitter.

The teacher can initiate review of the student screen by pressing a scan button 130 to display the student screens one-by-one on the teacher screen. When the scan feature is activated, indicator light 131 is illuminated. The student number is indicated in Row 125 above the ∅ in Row 127. The screens are each displayed for a time determined by setting the "scan-rate" knob 135 to a faster or slower position. Scanning can be interrupted at any time to allow the teacher to watch the present screen for a longer period by activating the "scan pause" button 136. A pause in scanning is indicated by a light 137. Scanning can be resumed with the next station in sequence by pressing scan-pause button 136 again. Then, the "scan reset" button 140 can be used to return to the first station for scanning.

The teacher can use a microphone, not shown, to communicate with the student at the station being scanned, or, when the Scan function button 130 is off, with the designated "receiving" stations, by pressing and holding the keypad 123 button marked "ALL." The volume of the communication received both by the teacher and by the student is adjustable by rheostat knob 145.

Students can initiate teacher review of their screens as explained below, to send a "teacher receive" signal to the teacher controller. "Teacher receive" signals are stored in a conventional First-in-First Out (FIFO) memory, not shown. The first "teacher receive" signal activates "student waiting" light 150, and the student station number is displayed by LED 152. The teacher views the interrupting screen by pressing "Advance TR Screen" button 155. If other students have also sent "teacher receive" signals, the "student waiting" light 150 remains lit, and those screens are displayed in succession by pressing "advance" button 155 again. The voice channel can also be used for communication with interrupting screens.

A preferred embodiment of the student controller panel 170 is shown in FIG. 3. The student controller has a "screen to TR" button 171 for sending a "teacher receive" signal to the teacher console FIFO memory. A light 172 indicates that a "teacher receive" is being sent. When the "teacher receive" signal has been entered into the FIFO memory, a "queued" light 174 is illuminated.

When the teacher presses the "to" keypad button and a given student station number, the number of the transmitting station being sent is displayed on receiving station indicator light 185. If the student is in the midst of an exercise that for some reason should not be interrupted, the student can use "no interrupt" button 176, accompanied by indicator light 177, to prevent the teacher station from breaking in with a transmission. If the teacher presses the keypad "override interrupts" button, the student "no interrupt" option is disabled.

The "scan" feature, the student interrupt queue, and the From-To connections can all be reset by pressing teacher console "system clear" button 200. This reconnects all student screen to their respective computers, sets the scan number to 1, and clears the interrupt queue in the FIFO. The clear button on the keyboard is used to reconnect all student screens to their respective computers without clearing the interrupt queue in the FIFO.

Teacher switching console 121 switches "From" and "To" lines may be connected in a matrix such as partially illustrated in FIG. 4. Inputs and outputs are connected to terminals 71 and 73 respectively. At each matrix crossover 73 and row conductor 74 connected to one output terminal 72 and a column conductor 76 connected to one output terminal 71 intersect. A switch 77 (FIG. 5) at this crossover spans the row conductor 74 and the column conductor 76. Thus, any input terminal 71 may be connected to any output terminal 72 by closing, and disconnected by opening, the appropriate switch 77. This matrix switching arrangement may be generally employed; however, inasmuch as some inputs are not intended to ever be connected to certain outputs, certain switches are either eliminated or disabled. For example, an override interrupt switch for the teacher receiving screen TR is not needed. The interrupt switches are each in series with a second switch in a line to an output, or from an input. The individual switches 77 may be remotely controlled so that the actual physical switch unit may be located wherever desired. The indicator lamps accompanying the switches in switching console 121 are conventionally connected.

FIG. 6 shows an alternative embodiment of the teacher switching console 21 which includes a column 51 of letters identifying computer output transmitting stations T, A, B and C. A row 52 of letters TR, T, A, B, C and ALL, identify the receiving screens. Each switch 54 is at the intersection of a row for a station labeled in column 51 and of a column for a station labeled in row 52. Switches 54 can connect the output of the row station to the input of the column station. There may be accompanying, simultaneous audio channel switching if audio switches are ganged to the video switches. Closing a switch in the ALL column connects the station for that row to all screens. Only one switch in each column or one ALL switch should be closed at any one time. Lights next to each of the switches 54 indicate the switch positions. A column 53 of lights similarly indicates which station output appears on screen TR.

An optional row 56 of one indicator light and one switch under each of columns T to C enables the teacher to disable student interrupts. An indicator light and switch are not necessary in the ALL column. A row 57 of indicator lights and corresponding switches enables the teacher to override student interrupts when the teacher wishes to make a correction or to provide further instructions.

Setting a "scan timer" 58 for a given time causes output from stations T, A,B, C, etc. to be successively displayed upon teacher screen T for review.

Screen TR receive student-initiated transmissions on a first-in-first-out basis. A toggle switch 59 and associated indicator lamp provided below column TR in the disable interrupt row enable the teacher to cut off reception of particular student computer outputs. Switch 59 controls a conventional FIFO memory to retain interrupts from student controllers 24, 34 and 44, to pass video signals in that order. Switch 59 is preferably a toggle normally set as illustrated to disable interrupts from other students while the teacher chooses to see a particular student screen. Switch 59 in the other position allows interruption by the next student signal.

FIG. 7 illustrates an alternative embodiment of a student controller 24. Each student station screen 23 displays the output of its computer 22 unless instructed otherwise by console 21. The source of the display is indicated by a pair of lights "own" and "other" 61. Student controller 24 has an indicator light 62 and associated switch 63 to transmit to the switch 59 FIFO memory an interrupt message requesting that the output of computer 22 be displayed on teacher receiving screen TR. Disable interrupt switch 64, accompanied by indicator light 66 at the student station, may be used to prevent the screen 23 display from being interrupted during an intricate problem solution. However, the teacher switching console interrupt override switches 57 have ultimate control over which computer output is displayed on each screen.

The present invention enables a teacher to teach and supervise each student without moving from a teacher station. Students may operate at their individual paces and the teacher can instruct, assist, correct and review the progress of each. The teacher may, for example, initially use the ALL switch in row "T" to apply the output of teacher computer 13 to all screens. Then, instructions entered in teacher computer 13 will be displayed to all students and to the teacher. Then, switching the student screens to receive the student computer output allows each student to proceed according to the instructions, for example, to carry out certain programmed learning functions. Actuation of switch 63 on the student controller 24 will transmit the video signal from the student's computer to the teacher receiving screen TR. Students can transmit the output of their computers to the teacher receiving screen TR when the student desires the teacher to look at his or her computer output for review or correction.

The separate computers of the present system, not being directly linked, need not be totally compatible and may operate with different software. Only the display screens, which are connected, need to operate on the same display codes. Thus there may, for example, appear upon screen 23 at Station A information that could not be generated by the computer 22.

The present invention, although uncomplicated, is a flexible teaching system having advantages over present manners of teaching by computers. The invention provides for controlling displays of computer outputs and visually indicates which output is being displayed at which location. The teacher can view either the teacher screen or any student screen and can transmit the output of any computer to any screen. The teacher console can prevent transmissions from being interrupted by students. Each student can display the output of their computer upon their screen and/or transmit it to the teacher receiving screen. The teacher can use the scan timer to scan the student screens at a selected rate.

Although preferred embodiments have been described it will be appreciated that numerous modifications and variations are possible within the scope of the present invention, and thus it is not intended to limit the invention to the precise details of the illustrations.

What is claimed is:

1. A computer teaching system for use with a plurality of separate and independently functioning student computer stations each having a computer and a display screen, and with a teacher station having an independently functioning teacher computer, a display screen and a receiver screen, comprising:
 a teacher switching console connected to the respective display signal outputs of all computers and to the respective display signal inputs of all display and receiver screens, with switching means thereon for selectively connecting any computer display signal output to any student display screen and the teacher receiver screen, and
 a student controller disposed one at each student station, and including switching means for selectively displaying the student computer generated display signal output upon said teacher receiving screen.

2. The system of claim 1 further defined by each of said switching means having an indicator means associated therewith for visually indicating switch operation.

3. The system of claim 2 wherein said indicator means are lights.

4. The system of claim 3 wherein said lights are LEDs.

5. The system of claim 1 further defined by override switches for overriding any interruption of the display on any screen of the system.

6. The system of claim 1 further defined by each student controller having means for indicating whether a specific student computer display signal output or another computer generated display signal output is being displayed on that particular student screen.

7. The system of claim 6 wherein said means for indicating is lights.

8. The system of claim 7 wherein said lights are LEDs.

9. The system of claim 1 further defined by said switching console including a timer switch having adjustable time settings and connected for successively switching the student computer display signal outputs onto the teacher receiver screen for a predetermined period, and a scan pause switch for fixing the present student computer display signal output to the teacher receiver screen.

10. The system of claim 1 further defined by said computers being non-compatible and independently operable upon differing programs.

11. The system of claim 1 further defined by the switching means of said teacher switching console and said student controllers also controlling audio channels in the same manner as video signals.

* * * * *